Figure 1:
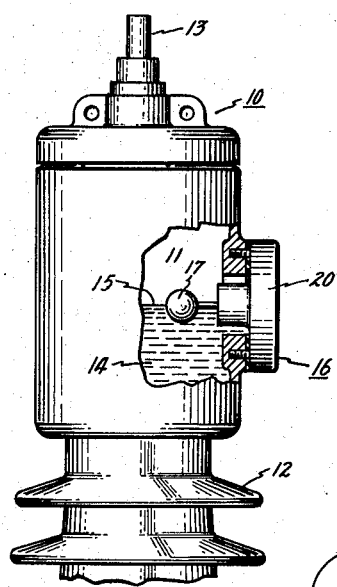

Nov. 11, 1958 E. F. CRONIN ET AL 2,859,724
GAUGE DIAL
Filed March 23, 1956

Inventors
Edward F. Cronin,
Joseph Mezzack,
Arthur J. Harrington, Jr,
by Gilbert P. Tarleton
Their Attorney.

2,859,724

GAUGE DIAL

Edward F. Cronin, Lenox, and Joseph Mezzack and Arthur J. Harrington, Jr., Pittsfield, Mass., assignors to General Electric Company, a corporation of New York Application March 23, 1956, Serial No. 573,359

12 Claims. (Cl. 116—118)

This invention relates to indicating gauges, and more in particular to a gauge for indicating three physical conditons, such as a normal range of liquid level, a high liquid level and a low liquid level. While the invention as disclosed in the following paragraphs as particularly adapted to the indication of liquid level in a dielectric filled high voltage electric insulating bushing, it will be obvious that the invention may be employed in the indication of physical conditions other than liquid level without departing from the scope thereof.

High voltage electrical insulating bushings of the insulating liquid filled type are frequently employed on high voltage electrical apparatus. In this type of bushing it is desirable to provide means for indicating the level of the insulating liquid so that at a glance it may be told whether the bushing is over filled, leaky or has the correct amount of insulating fluid. In the past this indication has been provided by several means. Initially, observation of the actual level of the bushing fluid was permitted by having a transparent glass terminal assembly on the upper end of the bushing. With the advent of completely sealed bushings, however, liquid level gauges were employed to indicate the oil level within the bushing structure.

The dials of the liquid level gauges employed showed end positions of high and low fluid levels on the arc of a circle, with a mid point on the arc indicating the normal fluid level position. The condition of the oil level on this type of gauge is normally indicated by a magnetically actuated pointer, which when not pointing to the normal oil level position indicates a trend of the fluid level either from normal to high level, or normal to low level.

The normal position on this type of gauge is generally determined from the desired fluid level at a certain temperature, such as 25° C. Due to the expansion or contraction of the fluid with temperature, however, the gauge may indicate a fluid level trend to either the high or low level positions when in effect the desired amount of fluid is present in the bushings. The indication of the fluid level in a hot or cold bushing, however, is normally of no concern to the user of a fluid filled bushing, and therefore the continuous indication of the fluid level of the bushing is extraneous and frequently confusing.

It is therefore an object of this invention to provide an improved gauge dial.

Another object is to provide a gauge dial in which different physical conditions are indicated by showing of different numbers of distinguishingly marked areas on the dial face of the gauge.

Still another object of this invention is to provide an indicator dial having one indication for a normal range of physical conditions, and different indications for each of two abnormal physical conditions.

A further object is to provide a gauge dial for indicating liquid level having a normal range, a high level, and a low level, the gauge dial indicating only one of the three levels and not trends from one level to the next.

A still further object of this invention is to provide a gauge dial for indicating the insulating fluid level of electrical insulating bushings, the dial indicating either a normal range of fluid level, a high level or a low level, and not indicating variation within the normal level range such as may arise from normal temperature variations.

Briefly stated, the indicating gauge of this invention comprises a rotatable plate having a plurality of distinguishingly marked areas on one face. A fixed mask is provided covering the face of the rotatable plate, and the mask has a plurality of areas through which the face may be observed. The aforesaid areas of the mask and rotatable plate are arranged so that at different angular displacements of the plate, which corresponds to different physical conditions, different numbers of the distinguishingly marked areas of the rotatable plate are visible through the aforesaid areas of the fixed mask.

In the preferred embodiment of this invention, the rotatable plate is circular, and the distinguishingly marked areas on the face are sector shaped. In this embodiment, both the plate and mask have a pair of sectors, the sector of the mask having equal arcs and being diametrically oppositely located. One of the marked sectors of the plate has twice the arc as the other marked sector, and the other marked sector is located diametrically opposite of the one sector, with one edge of each of the marked sectors lying on a common diameter of the face of the plate. Rotation of the circular plate in response to variable physical conditions is provided by means of a shaft affixed to the plate.

Figure 2:
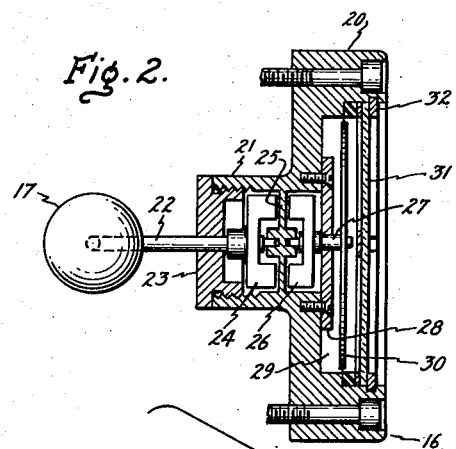
Figure 3:
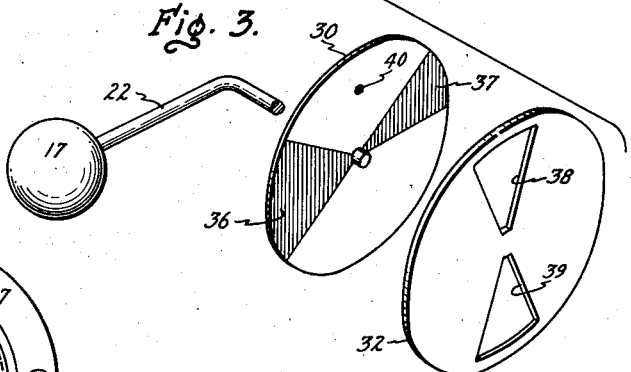
Figure 4:
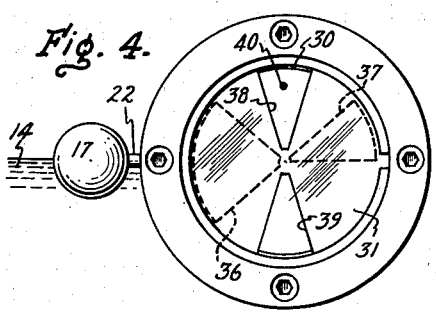
Figure 6:
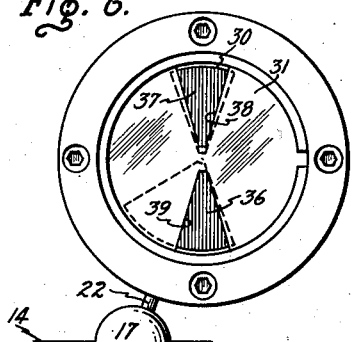
Figure 5:
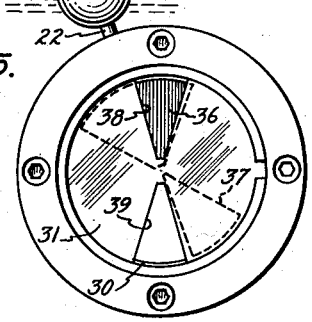

While the specification concludes with claims particularly pointing out and distinctly claiming the subject matter which we regard as our invention, it is believed the invention will be better understood from the following description taken in connection with the accompanying drawing in which:

Fig. 1 is a partially cross sectional view of an oil filled electrical insulating bushing and illustrating a typical mounting arrangement for a liquid level gauge, Fig. 2 is a cross sectional view of one embodiment of the gauge of Fig. 1, and illustrating a typical mounting arrangement for the gauge dial of this invention, Fig. 3 is an expanded perspective view of a dial face in accordance with this invention, Fig. 4 is a frontal view of the gauge of Fig. 2 and illustrating the dial face indication when the liquid level of the bushing of Fig. 1 is in the normal operating range, Fig. 5 is a frontal view of the gauge of Fig. 2 and illustrating the dial face indication when the liquid level is above the normal operating range, and Fig. 6 is a frontal view of the gauge of Fig. 2 and illustrating the dial face indication when the liquid level is lower than the operating range.

Referring now to the drawing, and more in particular to Fig. 1, therein is illustrated an upper end of a typical high voltage electrical insulating bushing having an upper terminal assembly 10 enclosing a chamber 11 and mounted on the end of a hollow insulating member 12. An upper terminal 13 extends from the terminal assembly 10 downwardly through the bushing. The entire bushing is filled with an insulating liquid 14 such as oil, the surface level 15 of the liquid being in the chamber 11. As has been stated previously, in normal operation of the apparatus the level 15 of the liquid portion may vary due to changes in the operating temperature of the bushing. While the user of the bushing is not normally concerned with the level of the fluid within this range, it is important that the conditions of under or over filling be indicated. For this purpose, a gauge 16 is provided on the terminal assembly 10 and having its face directed outwardly from the bushing.

The indication on the face of the gauge 16 may be actuated by a float 17 riding on the liquid level 15.

Referring now to Fig. 2, therein is illustrated in cross section a gauge of the type employed on the bushing of Fig. 1, and constructed in accordance with this invention. The gauge is generally cylindrical in shape, and has one portion 20 adapted to be mounted externally of the terminal assembly 10 of Fig. 1, and a reduced diameter portion 21 that extends through the wall of the terminal assembly 10.

The float 17 is connected to one end of shaft means 22, the other end of the shaft means extends through a bearing 23 threaded in the end of the reduced portion 21 of the gauge body member 19. The end of the shaft means 22 is connected to a magnet 24, the magnet 24 being mounted in the conventional manner with its poles adjacent a wall 25 extending transversely of the axis of the body member 19. The end of the shaft means 22 may be pivoted in the central portion of the wall 25. A follower magnet 26 is disposed on the opposite side of the wall 25 to provide angular motion for a shaft 27 in response to rotation of the shaft means 22. The end of the shaft 27 may be pivoted in the center of the wall 25, and the other end of the shaft 27 extends through a bearing plate 28 rigidly affixed to the body member 19.

The shaft 27 extends into an enlarged chamber 29 in the portion 20 of the body member 19, the chamber 29 being cylindrical and extending through the end of the gauge body 19 opposite the reduced diameter portion 21. A disk shaped member 30 is mounted on the end of the shaft 27 for rotation therewith. Transparent means, such as a glass plate 31 is provided over the open end of the chamber 29, and a mask 32 is located between the face of the disk 30 and the transparent plate 31. The mask 32 and disk 30 are arranged so that the disk 30 is visible only through removed portions of the mask 32.

The magnetic coupling means for transmitting angular displacement of the shaft 22 to the disk 30 is a conventional means for transmitting angular motion through a wall, and it is obvious that other means may be substituted therefor without departing from the spirit or scope of this invention.

The preferred arrangement of the disk 30 and the mask 32 is more clearly illustrated in Fig. 3, wherein it is shown that the face 35 of the disk 30 facing the mask 32 is provided with a pair of scissors 36 and 37 distinguishingly marked with respect to the remainder of the face 35. For example, the sectors 36 and 37 may be of a different color than the remainder of the face 35. As illustrated in Fig. 3, a pair of sectors 38 and 39 are removed from the mask 32.

In the preferred embodiment of the invention, one edge of each of the sectors 36 and 37 lie on a common diameter of the face 35, the sector 36 has twice the arc of the sector 37, and the sector 37 is located diametrically opposite a portion of the sector 36 on the face 35. The removed sectors 38 and 39 of the mask 32 are preferably diametrically oppositely located and have substantially the same arc as the smaller sector 37 on the face 35 of disk 30. The mask 32 is arranged so that the face 35 of disk 30 may be seen only through the removed sectors 38 and 39 of the mask.

As illustrated in Fig. 3, the shaft means 22 is provided with a bend, so that vertical movement of the float 17 in response to variation of the liquid level produces an angular displacement of the disk 30.

In Figs. 4, 5 and 6 of the drawing, the preferred embodiment of the gauge dial of this invention is illustrated showing the gauge indication for different levels of the liquid. Fig. 4 illustrates the indication for normal liquid level, Fig. 5 illustrates the indication for high liquid level, and Fig. 6 illustrates the indication for low liquid level.

Referring now to Fig. 4, the removed sectors 38 and 39 of the mask are vertically located with respect to each other and both of the distinguishingly marked sectors 37 and 36 are hidden behind the unremoved portions of the mask. From this illustration it is seen that both of the sectors 36 and 37 will remain hidden for a predetermined angular displacement of the disk 30 in either direction, and this range of angular displacement corresponds to the normal range of the liquid level. A mark 40 may be provided on the disk 30 as an index mark in order to prevent incorrect assembly of the gauge dial, and to identify the 25° C. normal level indication when the bushing is initially filled with oil.

If the liquid level is too high, as may result from over filling of the bushing, clockwise angular displacement of the disk 30 results in a portion of the distinguishingly marked sector 36 being visible through the removed sector 38. If on the other hand, the liquid level in the bushing is too low, such as may be caused by a leak in the bushing, counterclockwise angular displacement of the disk 30 results in the distinguishingly marked sector 37 being visible through the removed sector 38 of the mask and a portion of the distinguishingly marked sector 36 being visible through the removed sector 39 of the mask.

Thus, when the liquid level is within the normal range, no indication is given on the gauge dial, when the liquid level is too high, one distinguishingly marked sector is visible, and when the liquid level is too low, two distinguishingly marked sectors are visible.

Stop means (not shown) of any convenient nature may be employed on the gauge in order to prevent angular displacement of the disk 30 beyond the positions illustrated in Figs. 5 and 6.

While the previously disclosed relationships of relative dimensions and locations of the various sectors is a preferred arrangement, it will be obvious that other relative dimensions and locations may be employed without departing from the spirit or scope of this invention. Similarly, it is not intended that the recitation of pairs of sectors on the mask and disk be interpreted as a limitation of the broader aspects of the invention.

It will be understood, of course, that, while the form of the invention herein shown and described constitutes the preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. An indicating gauge comprising a rotatable plate having a plurality of distinguishingly marked areas on one face thereof with respect to the remainder of said face, a fixed mask covering said face and having a plurality of areas through which said face is visible, and means for rotating said plate in response to variable physical conditions, said areas being arranged so that at different angular displacements of said plate corresponding to dfferent physical conditions different numbers of said distinguishingly marked areas are selectively visible through said areas of said mask, depending upon the angular displacement of said plate.

2. An indicating gauge comprising a rotatable plate having a plurality of distinguishingly marked areas on one face thereof with respect to the remainder of said face, a fixed mask covering said face and having a plurality of areas through which said face is visible, and means for rotating said plate in response to variable physical conditions, said areas being arranged so that in at least one angular displacement of said plate corresponding to one physical condition none of said marked areas is visible and at other angular displacements of said plate corresponding to other physical conditions different numbers of said marked areas are selectively visible.

3. An indicating gauge comprising a rotatable plate having a plurality of distinguishingly marked sectors on one face thereof with respect to the remainder of said face, a fixed mask covering said face and having a plurality of sectors through which said face may be seen, and means for rotating said plate in response to variable physical conditions, said sectors being arranged so that at one range of angular displacements of said plate corresponding to one physical condition none of said marked sectors is visible and at other angular displacements of said plate corresponding to other physical conditions different numbers of said marked sectors are selectively visible.

4. An indicating gauge for indicating the presence of one of a number of physical conditions, at least one of said number of physical conditions being comprised of a range of conditions, comprising a rotatable plate having an angular displacement dependent upon said physical conditions, said plate having on one face thereof a plurality of distinguishingly marked sectors with respect to the remainder of said face, a fixed mask covering said face and having a plurality of sectors through which said face may be seen, and means for rotating said plate in response to said physical conditions, said sectors being arranged so that a different number of said marked sectors are selectively visible through the sectors of said mask for different angular displacements of said plate corresponding to each of the said number of physical conditions.

5. An indicating gauge comprising a rotatable plate having a plurality of distinguishingly marked areas on one face thereof with respect to the remainder of said face, a fixed mask covering said face and having a plurality of areas through which said distinguishingly marked areas are selectively visible depending upon the angular displacement of said plate, means providing angular displacement of said plate in response to a variable physical condition, said plate having a range of angular displacement corresponding to a normal physical condition, a first angular displacement in one direction adjacent said range corresponding to one abnormal condition, and a second angular displacement in the other direction adjacent said range corresponding to another abnormal condition, said areas being arranged so that a different number of said marked areas is visible for each of the three said conditions.

6. An indicating gauge comprising a rotatable plate having a plurality of distinguishingly marked sectors on one face thereof with respect to the remainder of said face, a fixed mask covering said face and having a plurality of sectors through which said distinguishingly marked sectors are selectively visible depending upon the angular displacement of said plate, means providing angular displacement of said plate in response to a variable physical condition, said plate having a range of angular displacements corresponding to a normal physical condition, a first angular displacement in one direction adjacent said range corresponding to one abnormal condition, and a second angular displacement in the other direction adjacent said range corresponding to a second abnormal condition, said sectors being arranged so that a different number of said marked sectors is visible for each of the three said conditions.

7. An indicating gauge responsive to a variable physical condition for indicating a variance of said physical condition from a predetermined range comprising a rotatable plate, means providing angular displacement of said plate in response to variation of said physical condition, said plate having a pair of distinguishingly marked regions on one face thereof in respect to the remainder of said face, a fixed mask covering said face and having a pair of regions through which said distinguishingly marked regions are selectively visible depending upon the angular displacement of said plate, said regions being arranged so that none of said marked regions is visible at first angular displacements of said plate corresponding to said predetermined range, at least a portion of only one of said marked regions is visible at second angular displacements beyond said first angular displacements in one direction, and at least a portion of both said marked regions is visible at third angular displacements beyond said first angular displacements in the other direction.

8. An indicating gauge comprising a rotatable plate having a pair of sectors on one face thereof distinguishingly marked with respect to the remainder of said face, a fixed mask covering said face and having a pair of sectors through which said distinguishingly marked sectors are selectively visible depending upon the angular displacement of said plate, and means for rotating said plate in response to variable physical conditions, said sectors being arranged to indicate at different times in response to variable physical conditions the three positions of (1) neither of the marked sectors is visible, (2) at least a portion of only one of the marked sectors is visible, and (3) at least a portion of both marked sectors is visible.

9. An indicating gauge comprising a rotatable circular plate having a pair of sectors on one face thereof distinguishingly marked with respect to the remainder of said face, a fixed mask covering said face and having a pair of diametrically oppositely located sectors through which said face is visible, one of said marked sectors having twice the arc as the other marked sector, said sectors of said mask having the same arc as said other marked sector, said marked sectors being arranged to indicate at different times in response to variable physical conditions the three positions of (1) neither of the marked sectors is visible, (2) at least a portion of only one of the marked sectors is visible, and (3) at least a portion of both marked sectors is visible.

10. An indicating gauge comprising a rotatable circular plate having a pair of sectors on one face thereof distinguishingly marked with respect to the remainder of said face, one of said marked sectors having substantially twice the arc as the other marked sector, a fixed mask covering said face and having a pair of diametrically oppositely located sectors through which said distinguishingly marked sectors are selectively visible depending on the angular displacement of said plate, said sectors of said mask having substantially the same arc as said other marked sector, said marked sectors having a common diameter on one edge thereof and said other marked sectors being diametrically oppositely located with respect to a portion of said one marked sector, and means for rotating said plate in response to variable physical conditions.

11. An indicating gauge comprising a rotatable circular plate having a pair of sectors on one face thereof distinguishingly marked with respect to the remainder of said face, one of said marked sectors having substantially twice the arc as the other marked sector, said marked sectors each having one edge lying on a common diameter and said other marked sector being diametrically oppositely located with respect to a portion of said one marked sector, a fixed mask covering said face and having a pair of diametrically oppositely located sectors through which said face is visible, said sectors of said mask having substantially the same arc as said other marked sector, and a rotatable shaft affixed to said circular plate and having an angular displacement depending upon a physical condition.

12. An indicating gauge comprising shaft means having an angular displacement dependent upon a variable physical condition, a circular rotatable plate affixed to said shaft means and having on one face thereof a pair of distinguishingly colored sectors with respect to the remainder of said face, one of said colored sectors having substantially twice the arc of the other colored sector, a fixed mask covering said face from view and having a pair of diametrically oppositely located sectors through which said face is visible, the sectors of said mask having substantially the same arc as said other colored sector, said sectors being arranged to expose none of said colored sectors during a normal range of said physical condition, to expose at least a portion of only one of said colored sectors upon angular displacement of said shaft means in one direction beyond a predetermined angle, and to expose at least a portion of both of said colored sectors upon angular displacement of said shaft means in the other direction beyond a predetermined angle.

References Cited in the file of this patent

UNITED STATES PATENTS

| | | |
|---|---|---|
| 1,462,371 | McConahy | July 17, 1923 |
| 1,712,692 | Dalrymple | May 14, 1929 |
| 1,751,847 | Wilt | Mar. 25, 1930 |

FOREIGN PATENTS

| | | |
|---|---|---|
| 413,619 | Great Britain | 1934 |